United States Patent [19]

Mink et al.

[11] 4,312,782
[45] Jan. 26, 1982

[54] TITANIUM HALIDE CATALYST FOR POLYMERIZATION

[75] Inventors: Robert Mink; Ronald Epstein, both of Yonkers, N.Y.

[73] Assignee: Stauffer Chemical Company, Westport, Conn.

[21] Appl. No.: 148,078

[22] Filed: May 12, 1980

[51] Int. Cl.$^3$ ................................................ C08F 4/64
[52] U.S. Cl. .................................. 252/429 B; 526/125
[58] Field of Search ...................................... 252/429 B

[56] References Cited

U.S. PATENT DOCUMENTS

| | | | |
|---|---|---|---|
| 3,758,621 | 9/1973 | Morikawa et al. | 252/431 P X |
| 3,784,481 | 1/1974 | Lassau et al. | 252/429 B X |
| 4,071,674 | 1/1978 | Kashiwa et al. | 252/429 B X |
| 4,076,924 | 2/1978 | Toyota et al. | 252/429 C X |
| 4,107,413 | 8/1978 | Giannini et al. | 252/429 B X |
| 4,143,223 | 3/1979 | Toyota et al. | 252/429 B X |
| 4,149,990 | 4/1979 | Giannini et al. | 252/429 B |

FOREIGN PATENT DOCUMENTS

78/1023  2/1978  South Africa .

Primary Examiner—Patrick Garvin
Attorney, Agent, or Firm—Henry Z. Friedlander

[57] ABSTRACT

A novel catalyst system for the polymerization of alpha-olefins is provided. The catalyst system comprises: (a) an organoaluminum containing component, e.g. triethyl aluminum, and (b) a titanium halide containing component. The titanium halide containing component is obtained by copulverizing a halogen containing magnesium compound, e.g. $MgCl_2$, with an active hydrogen containing organic compound, e.g. phenol, to produce a copulverized product. The copulverized product is then reacted with an organometallic compound of a metal of Groups I to III of the Periodic Table, e.g. triethyl aluminum, to produce a reaction product. The reaction product is then copulverized with a complex of a first titanium halide compound and an electron-donor, e.g. $TiCl_4$.ethyl benzoate, to produce a solid reaction product. The solid reaction product is then reacted with a second titanium halide compound, e.g. $TiCl_4$.

A novel titanium halide containing component is provided as well as a process for producing said component. A process for the polymerization of alpha-olefins is also provided.

61 Claims, No Drawings

TITANIUM HALIDE CATALYST FOR POLYMERIZATION

BACKGROUND OF THE INVENTION

1. Field of the Invention

This invention relates to a novel catalyst system for the polymerization of alpha-olefins, a novel titanium halide containing catalyst component used in said system, a process for producing said component and a process for the polymerization of alpha-olefins using such catalyst system.

2. Prior Art

The polymerization of alpha-olefins in the presence of a catalyst system comprising: (a) an organoaluminum containing component, and (b) a titanium halide containing component is well known in the art and the polymers produced utilizing such catalyst systems have found numerous uses. The resulting crystalline polymers have associated therewith, to a greater or lesser degree, a low molecular weight amorphous polymer. The production of polymers having a low concentration of such amorphous polymers results in a polymer having highly desirable properties. The production of highly stereoregular crystalline polymers is thus a desirable objective for a catalyst system and polymerization process.

It is also desirable that high amounts of polymer be produced per unit of time per unit of catalyst employed, i.e. the catalyst system have a high activity. Ideally, it is highly desirable to simultaneously improve the stereospecificity and activity of a catalyst system.

Various approaches to achieving the aforementioned objectives have been proposed in the art.

South African Pat. No. 78/1023 to Toyota et al. describes producing a titanium halide containing component by reacting a mechanically pulverized product of an organic acid ester and a halogen containing magnesium compound, with an active hydrogen containing organic compound in the absence of mechanical pulverization. The resulting reaction product is then reacted with an organometallic compound of a metal of Groups I to III of the Periodic Table in the absence of mechanical pulverization. The resulting solid reaction product is then washed with an inert organic solvent, and the resultant solid reacted with a titanium compound in the absence of mechanical pulverization. The resultant solids are then separated from the reaction system. This reference, however, does not teach copulverizing the halogen containing magnesium compound with an active hydrogen containing organic compound, nor copulverizing with a complex of a titanium halide compound and an electron donor prior to reacting with the titanium compound.

U.S. Pat. No. 4,149,990 to Giannini et al. describes a titanium halide containing component obtained by reacting a halogenated titanium compound with the reaction product of a magnesium dihalide, an electron donor compound and an organometallic compound and an electron donor free of active hydrogen atoms. The later electron donor may be reacted with the titanium compound prior to reacting with the magnesium dihalide containing product. This reference does not describe further reacting the product with a titanium halide compound nor copulverizing with a complex of a titanium halide compound and an electron donor prior to reacting with such titanium halide compound.

U.S. Pat. No. 4,076,924 to Toyota et al. describes a titanium halide containing component obtained by reacting a solid magnesium component with a liquid or solid titanium compound, the solid magnesium component being obtained by a reaction product derived from a magnesium dihalide, an alcohol, an organic acid ester and an organometallic compound. This references does not teach the use of phenol, applicant's preferred active hydrogen containing organic compound, copulverizing with a complex of titanium halide and an electron donor nor the final reacting of the product with a titanium halide compound.

Of additional interest is U.S. Pat. No. 4,143,223 to Toyota et al. which describes reacting a mechanically copulverized solid component of, for example, magnesium chloride, an organic acid ester and an active hydrogen containing compound, e.g. phenol, with a tetravalent titanium compound, e.g. $TiCl_4$. This reference does not teach reacting with an organometallic compound.

SUMMARY OF THE INVENTION

In accordance with this invention there is provided a novel catalyst system for the polymerization of alpha-olefins. The catalyst system comprises:

(a) an organoaluminum containing component; and
(b) a titanium halide containing component obtained by:
  (i) copulverizing a halogen containing magnesium compound with an active hydrogen containing organic compound to produce a copulverized product;
  (ii) reacting the copulverized product with an organometallic compound of a metal of Groups I to III of the Periodic Table to produce a reaction product;
  (iii) copulverizing the reaction product with a complex of a first titanium halide compound and an electron donor, to produce a solid reaction product; and
  (iv) reacting the solid reaction product with a second titanium halide compound.

In accordance with another aspect of this invention, a process is provided for the polymerization of alpha-olefins using the aforesaid catalyst system.

In accordance with still another aspect of this invention, a novel titanium halide containing component and a process for producing said component are provided.

DETAILED DESCRIPTION OF THE INVENTION

The invention as described herein is broadly applicable to the polymerization of olefins, corresponding to the formula $R-CH=CH_2$, wherein R is an alkyl radical containing from 1 to 8 inclusive carbon atoms, and hydrogen. The preferred olefins, however, include propylene, 1-butene, 1-pentene, 4-methyl-1-pentene and the like. The term "polymer" as used herein includes both homopolymers and copolymers, and the polymerization of mixtures of alpha-olefins with minor proportions of ethylene, as well as the polymerization of ethylene itself.

For the purposes of simplification, the invention is described herein with particular reference to the production of propylene, however, the invention is not to be so limited.

In the formation of the titanium halide containing component (b), the first step (i) is to copulverize a halogen containing magnesium compound with an active hydrogen containing organic compound to produce a copulverized product.

In preparing the copulverized product the halogen containing magnesium compound and the active hydrogen containing organic compound may be separately fed in the free state and mechanically pulverized, or they may be contacted in advance to form a complex or adduct, and mechanically pulverized in this state. Alternatively, these compounds may be fed in the form of compounds which can form these compounds by reactions under mechanical pulverization.

The mechanical pulverization is performed preferably in the substantial absence of oxygen and water using, for example, a ball mill, vibratory mill, or impact mill. The pulverization time, although differing from apparatus to apparatus, for example, is about 1 hour to about 10 days. The pulverization can be performed at room temperature, and it is not particularly necessary to heat or cool the pulverization system. Where there is a vigorous exotherm, the pulverization system is preferably cooled by a suitable means. The temperature is, for example, about 0° to about 100° C. Preferably, the pulverization is carried out until the halogen containing magnesium compound attains a surface area of at least 3 m²/g. especially at least 30 m²/g. The pulverization is usually carried out in a single step, but if desired, may be carried out in a multiplicity of steps. For example, it is possible first to pulverize the halogen containing magnesium compound and pulverization aids (described hereinbelow) and then add the active hydrogen containing organic compound, and continue the pulverization.

The copulverizing step (i) can be performed in the presence of an organic or inorganic pulverization aid. Examples of the pulverization aids include inert liquid diluents such as hexane, heptane, and kerosene; organic solid diluents such as polystyrene and polypropylene; and inert inorganic solids such as boron oxide, silicon oxide, and organosiloxanes. The pulverization aids can be used in an amount of about 0.01 to about 1.0 times the weight of the halogen containing magnesium compound.

In the present application, the term "copulverizing", "pulverization", etc. denote pulverization by suitable means by bringing the reaction components into mutual contact, for example, milling in a ball mill, vibratory mill or impact mill, and does not include mere mechanical stirring within its scope. Accordingly, the term "absence of mechanical pulverization" means the absence of such pulverizing means and does not preclude the presence of mere mechanical stirring that is customarily used in chemical reactions.

The halogen containing magnesium compound is desirably a solid which is preferably as anhydrous as possible, but the inclusion of moisture in an amount which does not substantially affect the performance of the catalyst is permissible. For the convenience of handling, it is advantageous to use the magnesium compound as a powder having an average particle diameter of about 1 to about 50 microns. Larger particles can be used, because they can be pulverized during the copulverizing step (i). The halogen containing magnesium compound may be those which contain other groups such as an alkoxy or phenoxy group, but magnesium dihalides give the best results.

Examples of preferred halogen containing magnesium compounds are magnesium dihalides such as magnesium chloride, magnesium bromide and magnesium iodide. The magnesium chloride being most preferred, however, magnesium halides having $C_1-C_4$ alkoxy such as ethoxy magnesium chloride and butoxy magnesium chloride and magnesium phenoxy halide such as :

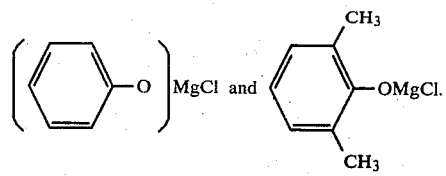

may also be used.

The amount of active hydrogen containing organic compound used in forming the copulverized product of step (i), is about 0.01 to about 10 mole, preferably about 0.5 to about 1.5 moles per mole of the halogen containing magnesium compound.

Examples of the active hydrogen containing organic compounds are alcohols, phenols, thiols, primary and secondary amines, aldehydes, organic acids, and amides and imides of the organic acids. The alcohols and phenols are especially preferred. Examples of these especially preferred active hydrogen containing organic compounds include aliphatic alcohols containing 1 to 8 carbon atoms such as methanol, ethanol, n-propanol, n-butanol, i-pentanol, hexanol, 2-ethylhexanol and ethylene glycol monomethylether; alicyclic alcohol containing 5 to 12 carbon atoms such as cyclohexanol or methylcylcohexanol; alcohols with 7 to 18 carbon atoms containing an aromatic ring such as benzyl alcohol, phenethyl alcohol or cumyl alcohol; and phenols containing 6 to 18 carbon atoms such as phenol, cresol, 2,6-dimethylphenol, butyl phenol, octyl phenol, nonyl phenol, dibutyl phenol, cumyl phenol and naphthol.

The copulverized product is then further reacted with an organometallic compound of a metal of Groups I to III of the periodic table in the absence of mechanical pulverization, i.e. reacting step (ii). This reaction is carried out, preferably in the presence of an inert organic liquid diluent such as hexane, heptane, kerosene and toluene. The reaction can be performed, for example, by adding the organometallic compound to a suspension of the copulverized product from step (i) in an inert organic liquid diluent. The amount of the copulverized product is preferably about 10 to about 500 grams per liter of diluent. The reaction is carried out preferably at a temperature of about 0° C. to about 100° C. and the reaction time is, for example, from about 10 minutes to about 10 hours. The amount of the organometallic compound can be properly chosen and is preferably about 0.01 to about 10 moles, more preferably about 0.1 to about 10 moles, per mole of the active hydrogen containing compound.

Preferably, the organometallic compound of a metal of Groups I to III of the Periodic Table is selected from the group consisting of:

(1) organoaluminum compounds of the formula

wherein $R^1$ and $R^2$ are identical to, or different from, each other, and represent a hdrocarbon radical containing 1 to 15 carbon atoms, preferably, an alkyl group containing 1 to 8 carbon atoms, or an aryl substituent, X represents a halogen atom, m is more than 0 but not more than 3 ($0<m\leq3$), n is at least 0 but less than 3 ($0 \leq n < 3$), p is at least 0 but less than 3 ($0 \leq p < 3$), and q is at least 0 but less than 3 ($0 \leq q < 3$), with the proviso that $m+n+p+q=3$, (2) aluminum complex alkyl compounds of the formula:

$$M^1AlR_4^3$$

wherein $R^3$ is the same as $R^1$ defined hereinabove, or hydrogen, $M^1$ represents lithium, sodium or potasium, and (3) compounds of the formula:

$$R^1R^4M^2$$

wherein $R^1$ is the same as defined hereinabove, $R^4$ is the same as $R^1$, or represents a halogen atom, and $M^2$ represents magnesium, zinc or cadmium.

Examples of the organoaluminum compounds (1) above are as follows:

(a) $p=q=0$ $$R_m^1Al(OR^2)_{3-m}$$

wherein $R^1$ and $R^2$ are the same as defined hereinabove, and m is preferably 1.5 to 3 ($1.5 \leq m \leq 3$).

(b) $n=p=0$ $$R_m^1AlX_{3-m}$$

wherein $R^1$ is the same as defined hereinabove, X is a halogen atom, and m is $0<m<3$.

(c) $n=q=0$ $$R_m^1AlH_{3-m}$$

wherein $R^1$ is the same as defined hereinabove, and m is preferably $2 \leq m < 3$.

(d) $p=0$ $$R_m^1Al(OR^2)_nX_q$$

wherein $R^1$ and $R^2$ are the same as defined hereinabove, X is a halogen, $0<m \leq 3$, $0 \leq n < 3$, $0 \leq q < 3$, and $m+n+q=3$.

Specific examples of the aluminum compound (1) include trialkyl aluminums such as triethyl aluminum or tributyl aluminum and combinations of these, preferably triethyl aluminum and tributyl aluminum ($p=q=0$, and $m=3$); dialkyl aluminum alkoxides such as diethyl aluminum sesquialkoxides such as ethyl aluminum sesquiethoxide and butyl aluminum sesquibutoxide; and alkoxylated alkyl aluminums having an average composition expressed, for example, by $R_{2.5}^1Al(OR^2)_{0.5}$ ($p=q=0$, $1.5 \leq m < 3$); partially halogenated alkyl aluminums ($n=p=0$) such as dialkyl aluminum halogenides ($m=2$) such as diethyl aluminum chloride, dibutyl aluminum chloride and diethyl aluminum bromide; alkyl aluminum sesquihalogenides ($m=1.5$) such as ethyl aluminum sesquichloride, butyl aluminum sesquichloride and ethyl aluminum sesquibromide; and alkyl aluminum dihalogenides ($m=1$) such as ethyl aluminum dichloride, propyl aluminum dichloride and butyl aluminum dibromide; partially hydrogenated alkyl aluminums ($n=q=0$) such as dialkyl aluminum hydrides ($m=2$) such as diethyl aluminum hydride and dibutyl aluminum hydride; and alkyl aluminum dihydrides ($m=1$) such as ethyl aluminum dihydride and propyl aluminum dihydride; and partially alkoxylated and halogenated alkyl aluminums ($p=0$) such as ethyl aluminum ethoxychloride, butyl aluminum butoxychloride and ethyl aluminum ethoxybromide ($m=n=q=1$).

Examples of the organometallic compounds (2) to (4) above include lithium aluminum hydride, lithium aluminum tetraethyl [$LiAl(C_2H_5)_4$], sodium aluminum tetrabutyl, potassium aluminum tetraethyl, diethyl magnesium, diethyl zinc, diethyl cadmium and ethyl magnesium chloride.

The reaction product of the organometallic compound and the copulverized product is then copulverized with a complex of a first titanium halide compound and an electron donor to produce a solid reaction product, i.e. copulverizing step (iii). The copulverizing is accomplished as in copulverizing step (i). Thus, the copulverizing is performed, preferably in the substantial absence of oxygen and water using, for example, a ball mill, vibratory mill or impact mill. The pulverization time, although differing from apparatus to apparatus, for example, is about 1 hour to about 10 days. The pulverization can be performed at room temperature, and it is not particularly necessary to heat or cool the pulverization system. Where there is a vigorous exotherm, the pulverization system is preferably cooled by a suitable means. The temperature is, for example, about 0° to about 100° C. Preferably, the pulverization is carried out until the solid reaction product produced attains a surface area of at least about 3 $m^2/g.$, especially about 30 $m^2/g$. The pulverization is usually carried out in a single step, but if desired, may be carried out in a multiplicity of steps. For example, it is possible to pulverize the initial reaction product, i.e. the reaction product from step (ii), and pulverization aids, add the complex and then continue the pulverization.

The copulverizing can be performed in the presence of organic or inorganic pulverization aids in the amounts previously described.

The titanium halide compound can be bivalent, trivalent or tetravalent titanium. Preferred titanium halides are titanium trichloride materials (described below) and titanium tetrachloride.

The titanium trichloride material which may be used in the complex can be produced in a variety of ways including:

(a) reduction of titanium tetrachloride with a metal such as aluminum or titanium, the reduced titanium material being either milled or unmilled;

(b) reduction of titanium tetrachloride with hydrogen;

(c) reduction of titanium tetrachloride with an organometallic compound such as an aluminum alkyl; or (d) grinding a combination of titanium trichloride and a halide of a Group III metal, such as an aluminum halide.

Examples of suitable titanium trichloride materials are well known in the art and are described in a number of publications and patents, including U.S. Pat. Nos. 3,639,375 to Staiger et al. and 3,701,763 to Wada et al. which are each incorporated herein by reference as showing the type of titanium trichloride material that may be used in the present invention.

Examples of specific titanium halide compounds which may be used in the complex are $TiCl_4$, $TiI_4$, $Ti(OC_3H_7)Cl_3$, $Ti(OC_4H_9)_2Cl_{hd\ 2}$, $3TiCl_3.AlCl_3$, $Ti[O—C(CH_3)=CH—CO—CH_3]_2Cl_2$, $Ti[N(C_2H_5)_2]Cl_3$, Ti(OC$_6$H$_5$)Cl$_3$, Ti[N(C$_6$H$_5$)$_2$]Cl$_3$, Ti(C$_6$H$_5$COO)Cl$_3$, [N(C$_4$H$_9$)]$_2$TiCl$_6$, [N(CH$_3$)$_4$]Ti$_2$Cl$_9$, TiBr$_4$, TiCl$_3$OSO$_2$C$_6$H$_5$, and LiTi(OC$_3$H$_7$)$_2$Cl$_3$.

The titanium halide compound, e.g. the titanium trichloride material or titanium tetrachloride, is combined with an electron donor compound. Examples of suitable electron donor compounds which can be used in the present invention can be selected from those described in U.S. Pat. Nos. 3,639,375 to Staiger et al. and 3,701,763 to Wada et al. The following classes of electron donor compounds may be used:

Organic oxygen-containing compounds such as the aliphatic ethers, aromatic ethers, aliphatic carboxylic esters, cyclic esters of carbonic acid, aromatic carboxylic esters, unsaturated carboxylic esters, aliphatic alcohols, phenols, aliphatic carboxylic acids, aromatic carboxylic acids, aliphatic carboxylic acid halides, lactones, aromatic carboxylic acid halides, aliphatic ketones, aromatic ketones, and monoterpenic ketones;

Organic nitrogen-containing compounds such as the aliphatic amines, aromatic amines, heterocyclic amines, aliphatic nitriles, aliphatic carbamates, aromatic nitriles, aromatic isocyanates, and aromatic azo compounds;

Mixed oxygen-nitrogen compounds such as the aliphatic and aromatic amides and guanidine and its alkyl substituted derivatives;

Organic phosphorus-containing compounds such as the aliphatic phosphines, aromatic phosphines;

Mixed phosphorus-nitrogen compounds such as the phosphoric amides;

Sulfur-containing compounds such as carbon disulfide, the aliphatic thioethers and the aromatic thioethers; and Organic silicon-containing compounds including monomer type compounds such as the tetrahydrocarbylsilanes, organohydrogenosilanes, organohalogenosilanes, organoaminosilanes, organoalkoxysilanes, organoaryloxysilanes, organosilicon isocyanates and organosilanol carboxylic acid esters; and polymer type of compounds such as the polysilalkylenes, organopolysilanes, organopolysiloxanes, $\gamma,\omega$-dihaloorganopolysiloxanes, organocyclopolysiloxanes and polysilazanes.

Examples of some electron donor compounds are hexamethyl phosphoric triamide, dimethyl formamide, benzonitrile, $\gamma$-butyrolactone, dimethyl acetamide, N-methyl pyrrolidone, N,N-dimethylpivalamide, toluene diisocyanate, dimethyl thioformamide, ethylene carbonate, trilauryl trithiophosphite, tetramethyl guanidine and methyl carbamate. Other electron-donors are: N,N,N'N'tetramethylenediamine, veratrol, ethyl benzoate, acetone, 2,5-hexanedione, dimethyl maleate, dimethyl malonate, tetrahydrofurfurylmethylether, nitrobenzene, diethyl carbonate, acetophenone, 1,2,4-trimethyl piperazine, ethyl acetate. Particularly preferred is ethyl benzoate. Others that can be used in practicing the present invention are known to persons of skill in the art.

Organic acid esters are particularly preferred electron-donors.

The organic ester used in forming the complex is preferably selected from the group consisting of aliphatic carboxylic esters, halogenated aliphatic carboxylic esters, alicyclic carboxylic acid esters, and aromatic carboxylic acid esters. Preferred species are aliphatic carboxylic esters containing up to 18 carbon atoms, halogenated aliphatic carboxylic esters containing up to 18 carbon atoms, alicyclic carboxylic esters containing up to 12 carbon atoms, and aromatic carboxylic esters containing up to 20 carbon atoms.

Examples of such organic esters are esters formed between carboxylic acids or halocarboxylic acids selected from the group consisting of saturated or unsaturated aliphatic carboxylic acids containing 1 to 8 carbon atoms, especially 1 to 4 carbon atoms and their halogen-substitution products, and alcohols or phenols selected from the group consisting of saturated or unsaturated aliphatic primary alcohols containing 1 to 8 carbon atoms, especially 1 to 4 carbon atoms, saturated or unsaturated alicyclic alcohols containing 3 to 8 carbon atoms, especially 5 to 6 carbon atoms, phenols containing 6 to 10 carbon atoms, especially 6 to 8 carbon atoms, and alicyclic or aromatic primary alcohols having a C$_1$-C$_4$ aliphatic saturated or unsaturated primary alcohol moiety bonded to an alicyclic or aromatic ring with 3 to 10 carbon atoms. Further examples include esters formed between alicyclic carboxylic acids containing 6 to 12 carbon atoms, especially 6 to 8 carbon atoms, and saturated or unsaturated aliphatic primary alcohols containing 1 to 8, especially 1 to 4, carbon atoms. There can also be cited esters formed between aromatic carboxylic acids containing 7 to 12 carbon atoms, especially 7 to 10 carbon atoms, and alcohols or phenols selected from the group consisting of saturated or unsaturated aliphatic primary alcohols containing 1 to 8 carbon atoms, especially 1 to 4 carbon atoms, and alicyclic or aromatic primary alcohols having a C$_1$-C$_4$ aliphatic saturated or unsaturated primary alcohol moiety bonded to an alicyclic or aromatic ring with 3 to 10 carbon atoms.

Specific examples of the aliphatic carboxylic esters are primary alkyl esters of saturated fatty acids such as methyl formate, ethyl acetate, n-amyl acetate, 2-ethylhexyl acetate, n-butyl formate, ethyl butyrate and ethyl valerate; alkenyl esters of saturated fatty acids such as vinyl acetate and allyl acetate; primary alkyl esters of unsaturated fatty acids such as methyl acrylate, methyl methacrylate, and n-butyl crotonate, and halogen-substitution products of these esters.

Specific examples of the alicyclic carboxylic esters include methyl cyclohexanecarboxylate, ethyl cyclohexanecarboxylate, methyl methylcyclohexanecarboxylate and ethyl methylcyclohexanecarboxylate.

Specific examples of the aromatic carboxylic esters include primary alkyl esters of benzoic acid such as methyl benzoate, ethyl benzoate, n-propyl benzoate, n- or i-butyl benzoate, n- and i-amyl benzoate, n-hexyl benzoate, n-octyl benzoate, and 2-ethylhexyl benzoate; primary alkyl esters of toluic acid such as methyl toluate, ethyl toluate, n- or i-butyl toluate, and 2-ethylhexyl toluate; primary alkyl esters of anisic acid such as methyl anisate, ethyl anisate, or n-propyl anisate; and primary alkyl esters of naphthoic acid such as methyl naphthoate, n-propyl naphthoate, n-butyl naphthoate, and 2-ethylhexyl naphthoate.

Of these compounds, the aromatic carboxylic esters are preferred. Alkyl esters with 1 to 4 carbon atoms, particularly methyl or ethyl esters, of benzoic acid, p-toluic acid or p-anisic acid are especially preferred.

The amount of electron donor and titanium halide used in the titanium halide containing compound are both about 0.01 to about 1 mole, preferably about 0.01 to about 0.5 moles per mole of the halogen containing magnesium compound.

In the final step, (iv) of forming the titanium halide containing component in accordance with this invention, the resultant solid reaction product from step (iii) is reacted with a second titanium halide compound. The reaction is preferably carried out in the absence of mechanical pulverization. This reaction can be performed by suspending the solid reaction product in a liquid titanium halide compound or a solution of a titanium halide compound in an inert organic solvent, e.g., hexane, heptane, kerosene and toluene.

The amount of the titanium halide compound is at least about 0.001 mole, preferably at least about 0.1 mole, and especially preferably at least about 10 moles, per mole of magnesium in the solid reaction product from step (iii). The reaction temperature is usually from room temperature to about 200° C. and the reaction time is about 10 minutes to about 5 hours. The reaction may be performed for longer or shorter periods of time. After the reaction, the unreacted titanium halide compound is removed by filtration of decantation, and the reaction product may be washed with a suitable inert solvent such as hexane, heptane or kerosene to remove the soluble titanium compound as much as possible.

The second titanium halide compound may be selected from those previously mentioned as used as the first titanium halide compound. A highly preferred titanium halide compound is titanium tetrachloride.

The organoaluminum containing component of the catalyst system of this invention contains the conventional organoaluminum compound, used in the polymerization of alpha-olefins using conventional reaction conditions for such a polymerization. The organoaluminum compounds which are particularly suitable are: alkylhaloaluminum compounds having the formula $AlR_nX_{3-n}$, wherein R represents $C_{1-14}$ a saturated hydrocarbon residue; X represents a halogen, particularly Cl and Br, and n is 2 or 1.5; and alkyl aluminum compounds having the formula $AlR_n(OR')_{3-n}$ where R and n are defined above and R' represents a $C_{1-14}$ saturated hydrocarbon residue that can be the same as R. Trialkyl aluminums having the formula AlRR'R", where R, R' and R" are the same or different and respectively, represent a $C_{1-14}$ saturated hydrocarbon residue are a particularly preferred group for use.

The following are examples of suitable organoaluminum compounds: trimethyl aluminum, triethyl aluminum, n-tripropyl aluminum, n-tributyl aluminum, triisobutyl aluminum, trioctyl aluminum, tridodecyl aluminum, methyl aluminum sesquichloride, ethyl aluminum sesquichloride, diethyl aluminum chloride, ethyl aluminum dichloride, dibutyl aluminum chloride, ethyl aluminum sesquibromide, and mixtures thereof. Triethyl aluminum is a particularly preferred organoaluminum compound for use in this invention for the polymerization of propylene.

The organoaluminum compounds may also, for example, contain two or more aluminum atoms linked together through an oxygen or a nitrogen atom. These organoaluminum compounds are obtained by the reaction of a trialkyl aluminum compound with water, ammonia or a primary amine, according to known methods. Typical examples of such compounds are:

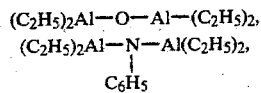

The organoaluminum containing compound may be used in combination with an electron donor (such as a Lewis base) to form the organoaluminum containing component.

Suitable electron donor compounds are amines, amides, ethers, esters, ketones, nitriles, phosphines, stibines, arsines, phosphoramides, thioethers, aldehydes, alcoholates, amides and the organic acid salts of metals belonging to the first four groups of the Periodic Table. The best results, with regard to both activity and stereospecificity, are achieved when esters of carboxylic acids particularly esters of aromatic acids, are used as the electron donors.

Examples of esters which can be used are: esters of aliphatic, cycloaliphatic and aromatic mono- and polycarboxylic acids; esters of alkoxy or amino acids; esters of inorganic acids such as carbonic, phosphorous, sulfuric, phosphoric and silicic acids. Examples of specific compounds are: ethyl benzoate, methyl benzoate, methyl and ethyl p-methoxybenzoate, ethyl n-buylbenzoate, and ethyl p- and o- chlorobenzoate, ethyl p-n-butoxybenzoate, isobutylbenzoate, methyl and ethyl p-methylbenzoate, ethyl acetate, ethyl propionate, ethyl alpha-naphthoate, ethyl cyclohexanoate, ethyl pivalate, ethyl N,N-diethyl carbamate, diethyl carbonate, diethyl sulfate, dimethyl maleate, ethyl benzensulfonate, triethyl borate, ethyl naphthenate, ethyl toluate, ethyl p-butoxy-benzoate, ethyl cyclohexanoate and ethyl pivalate.

The organoaluminum compound/electron donor molar ratio can generally be lower than 10:1 and, in the case of ester electron donors, ranges from 10:1 to 2:1, and more particularly from 6:1 to 2:1.

For a general guidance, the quantity of titanium present in the titanium halide containing component is between about 0.1 and 10% by weight, expressed as elemental titanium. Again, for general guidance, the quantity of titanium present in the catalyst system, expressed as titanium metal, may be less than 0.3 gram atoms per mole of the total amount of electron donor compound present in the catalyst system, preferably, this quantity is less than about 0.1 gram atoms and more particularly it is about 0.05 and 0.005 gram atoms. The Al (from the organoaluminum containing component)/Ti molar ratio is generally less than 1,000 and most preferably less than 500, and most preferably from about 100 to about 500.

The conditions under which the polymerization of alpha-olefins with the aid of the catalyst system of this invention is conducted are those known in the art. The polymerization is carried out at temperatures ranging from −80° C. to 150° C., preferably from 40° C. to 100° C., operating with partial pressures of the alpha-olefins higher than atmospheric pressure. The polymerization can be carried out both in liquid phase in the presence, or in the balance of an inert diluent, or in the gas phase. The alpha-olefins comprise in general olefins $CH_2=CHR$ in which R is an alkyl radical containing 1 to 8 inclusive carbon atoms and hydrogen. Propylene, 1-butene, 1-pentene, 4-methyl-1-pentene are preferred examples of alpha-olefins. As hereinbefore indicated the process can be used to polymerize mixtures of alpha-olefins with minor proportions of ethylene and also ethylene itself.

Examples of inert diluents which may be used in the polymerization are the $C_4-C_8$ aliphatic hydrocarbons, examples of which are n-hexane, n-heptane, the cycloaliphatic hydrocarbons like cyclohexane and the aromatic ones such as benzene, toluene, and xylene.

The regulation of the molecular weight of the polymer during the polymerization may also be carried out according to known methods, e.g. operating in the presence of alkyl halides, zinc or cadmium organometallic compounds or hydrogen.

It has been found that the catalyst system of this invention has enhanced stereospecificity and/or activity.

The following examples are given to illustrate better the present invention and are not intended to be limiting.

POLYMERIZATION PROCEDURE

The following polymerization procedure was utilized.

A one gallon jacketed autoclave, i.e., the polymerization reactor, equipped with a mechanical stirrer was charged with 2 liter of dry heptane at about 45° C. to 55° C.

The catalyst system was then added to the autoclave as follows:

A nitrogen purge was passed through the autoclave and adjusted to purge the port during the addition of the catalyst system. A weighed quantity of the organoaluminum compound was added by syringe and stirred for 5 or 10 seconds. A weighed quantity of the required electron donor was then added through the port and the reactor stirred for another 5 to 10 seconds. The solid titanium halide containing catalyst component was then added. Propylene was then injected into the autoclave to a pressure of 10 atmospheres and the temperature maintained at 65° C. During the polymerization, additional propylene was fed as needed to maintain this pressure. The polymerization test was carried out for 1½ hours.

At the end of the polymerization, the polymer mixture was filtered, washed with isopropanol, and oven dried at 70° C. and weighed to produce Dry Polymer. The polymerization solvent is evaporated to determine heptane soluble polymer. The catalyst activity is defined herein as the ratio:

$$\frac{\text{Weight of Dry Polymer and Weight of Heptane Soluble Polymer}}{\text{Weight of Solid Catalyst Component}}$$

The Dry Polymer is extracted with heptane for 3 hours in a Soxhlet apparatus. The percent heptane insolubles ("$C_7$") is defined as the percentage of the heptane insoluble fraction in the Dry Polymer.

The Isotactic Index (II), a measure of the insoluble polymer produced, is defined herein as:

$$II = \frac{\text{``}C_7\text{''} \times \text{Wt. of Dry Polymer}}{\text{Wt. of Total Polymer Produced}}$$

The total polymer produced includes the Dry Polymer and the polymer produced which was soluble in the polymerization solvent.

EXAMPLE 1

A mixture of 22 g $MgCl_2$, 22.5 g phenol, and 3.3 ml of silicone oil were milled for 6 days. This mixture (9.6 g) was treated with 16.2 mmol. of triethyl aluminum, TEAL, (phenol/TEAL mole ratio=3) for 1 hour at room temperature. The mixture was filtered, the precipitate washed with 700 ml heptane and dried over night under vacuum. The mixture (6.9 g) and 2.5 g of $TiCl_4$·ethyl benzoate were milled for 2 days. This product (4.8 g) was then treated with $TiCl_4$ (60 ml) for 1 hour at 100° C. It was then filtered, and the precipitate washed with heptane (800 ml) and dried overnight under vacuum. The Ti content was 4.4%. The heptane slurry activity using TEAL and methyl-p-toluate at 4:1 molar ratio was 5597 g polypropylene/g catalyst, and the II was 86.1%. With TEAL alone as a cocatalyst, the activity/II was 9936/36.7%.

COMPARATIVE EXAMPLE 1

The procedure of Example 1 was repeated but the final treatment with $TiCl_4$ was omitted. The activity/II with TEAL as a cocatalyst was 2060/28.8.

We claim:

1. A catalyst system comprising:
   (a) an organoaluminum containing component; and
   (b) a titanium halide containing component obtained by:
   (i) copulverizing a halogen containing magnesium compound with an active hydrogen containing organic compound to produce a copulverized product;
   (ii) reacting the copulverized product with an organometallic compound of a metal of Groups I and III of the Periodic Table to produce a reaction product;
   (iii) copulverizing the reaction product with a complex of a first titanium halide compound and an electron donor to produce a solid reaction product; and
   (iv) reacting the solid reaction product with a second titanium halide compound.

2. The system of claim 1, wherein the copulverizing step (i) is performed in the presence of an efffective amount of an organic or inorganic pulverization aid.

3. The system of claim 2, wherein the pulverization aid is selected from the group consisting of hexane, heptane, kerosene, polystyrene, polypropylene, boron oxide, silicon oxide and organosiloxanes.

4. The system of claim 2, wherein the effective amount is from about 0.01 to about 1 times the weight of the halogen containing magnesium compound.

5. The system of claim 1, wherein the halogen containing magnesium compound is $MgCl_2$.

6. The system of claim 1, wherein the active hydrogen containing organic compound is used in an amount of about 0.01 to 10 moles of active hydrogen containing organic compound per mole of halogen containing magnesium compound.

7. The system of claim 1, wherein the active hydrogen containing organic compound is selected from the group consisting of alcohols, phenols, thiols, primary and secondary amines, aldehydes, organic acids, and amides and imides of organic acids.

8. The system of claim 1, wherein the active hydrogen containing organic compound is an alcohol or a phenol.

9. The system of claim 1, wherein the active hydrogen containing organic compound is selected from the group consisting of aliphatic alcohols containing 1 to 8 carbon atoms, alicyclic alcohol containing 5 to 12 carbon atoms, alcohols with 7 to 18 carbon atoms containing an aromatic ring, and phenols containing 6 to 18 carbon atoms.

10. The system of claim 1, wherein the active hydrogen containing organic compound is selected from the group consisting of methanol, ethanol, n-propanol, n- butanol, i-pentanol, hexanol, 2-ethylhexanol, ethylene glycol monomethylether, cyclohexanol, methylcyclohexanol, benzyl alcohol, phenethyl alcohol, cumyl alcohol, phenol, cresol, 2,6-dimethylphenol, butyl phenol, octyl phenol, nonyl phenol, dibutyl phenol, cumyl phenol and naphthol.

11. The system of claim 1, wherein the active hydrogen containing compound is phenol.

12. The system of claim 1, wherein the organometallic compound used is from about 0.01 to about 10 moles of organometallic compound per mole of active hydrogen containing compound.

13. The system of claim 1, wherein the organometallic compound is selected from the group consisting of:
(1) organoaluminum compounds of the formula:

$$R^1_m Al(OR^2)_n H_p X_q$$

wherein $R^1$ and $R^2$ are identical to, or different from, each other, and represent a hydrocarbon radical containing 1 to 15 carbon atoms, preferably, an alkyl group containing 1 to 8 carbon atoms, or an aryl substituent, X represents a halogen atom, m is more than 0 but not more than 3 ($0 < m \leq 3$), n is at least 0 but less than 3 ($0 \leq n < 3$), p is at least 0 but less than 3 ($0 \leq p < 3$), and q is at least 0 but less than 3 ($0 \leq q < 3$), with the proviso that $m+n+p+q=3$, (2) aluminum complex alkyl compounds of the formula:

$$M^1 AlR_4^3$$

wherein $R^3$ is the same as $R^1$ as defined hereinabove $M^1$ represents lithium, sodium or potassium; and (3) compounds of the formula:

$$R^1 R^4 M^2$$

wherein $R^1$ is the same as defined hereinabove, $R^4$ is the same as $R^1$, or represents a halogen atom, and $M^2$ represents magnesium, zinc or cadmium.

14. The system of claim 1, wherein the organo metallic compounds are selected from the group consisting of: triethyl aluminum, tributyl aluminum, ethyl aluminum sesquiethoxide, butyl aluminum sesquibutoxide, diethyl aluminum chloride, dibutyl aluminum chloride and diethyl aluminum bromide, ethyl aluminum sesquichloride, butyl aluminum sesquichloride, ethyl aluminum sesquibromide, ethyl aluminum dichloride, propyl aluminum dichloride, and butyl aluminum dibromide, diethyl aluminum hydride, ethyl aluminum dihydride, propyl aluminum dihydride, ethyl aluminum ethoxychloride, butyl aluminum butoxychloride, ethyl aluminum ethoxybromide, lithium aluminum hydride lithium aluminum tetraethyl, sodium aluminum tetrabutyl, potassium aluminum tetraethyl, diethyl magnesium, diethyl zinc, diethyl cadmium and ethyl magnesium chloride.

15. The system of claim 1, wherein the organometallic compound is triethyl aluminum.

16. The system of claim 1, wherein the first and second titanium halide compound are independently selected from the group consisting of a titanium trichloride material and titanium tetrachloride.

17. The system of claim 1, wherein the quantity of titanium present in the titanium halide containing component is about 0.1% to about 10% by weight, expressed as titanium metal.

18. The system of claim 1, wherein the electron donor is an organic ester selected from the group consisting of aliphatic carboxylic esters containing up to 18 carbon atoms, halogenated aliphatic carboxylic esters containing up to 18 carbon atoms, alicyclic carboxylic esters containing up to 12 carbon atoms, and aromatic carboxylic esters containing up to 20 carbon atoms.

19. The system of claim 1, wherein the complex is a $TiCl_4$·ethyl benzoate complex.

20. The system of claim 1, wherein the organoaluminum containing component is triethylaluminum and an ester of an aromatic acid.

21. A titanium halide containing component obtained by:
(i) copulverizing a halogen containing magnesium compound with an active hydrogen containing organic compound to produce a copulverized product;
(ii) reacting the copulverized product with an organometallic compound of a metal of Groups I to III of the Periodic Table to produce a reaction product;
(iii) copulverizing the reaction product with a complex of a first titanium halide compound and an electron donor to produce a solid reaction product; and
(iv) reacting the solid reaction product with a second titanium halide compound.

22. The component of claim 21, wherein the copulverizing step (1) is performed in the presence of an effective amount of an organic or inorganic pulverization aid.

23. The component of claim 22, wherein the pulverization aid is selected from the group consisting of hexane, heptane, kerosene, polystyrene, polypropylene, boron oxide, silicon oxide and organosiloxanes.

24. The component of claim 22, wherein the effective amount is from about 0.01 to about 1 times the weight of the halogen containing magnesium compound.

25. The component of claim 21, wherein the halogen containing magnesium compound is $MgCl_2$.

26. The component of claim 21, wherein the active hydrogen containing organic compound is used in an amount of about 0.01 to 10 moles of active hydrogen containing organic compound per mole of halogen containing magnesium compound.

27. The component of claim 21, wherein the active hydrogen containing organic compound is selected from the group consisting of alcohols, phenols, thiols, primary and secondary amines; aldehydes, organic acids, and amides and imides of organic acids.

28. The component of claim 21, wherein the active hydrogen containing organic compound is an alcohol or a phenol.

29. The component of claim 21, wherein the active hydrogen containing organic compound is selected from the group consisting of aliphatic alcohols containing 1 to 8 carbon atoms, alicyclic alcohols containing 5 to 12 carbon atoms, alcohols with 7 to 18 carbon atoms containing an aromatic ring, and phenols containing 6 to 18 carbon atoms.

30. The component of claim 21, wherein the active hydrogen containing organic compound is selected from the group consisting of methanol, ethanol, n-propanol, n-butanol, i-pentanol, hexanol, 2-ethylhexanol, ethylene glycol monomethylether, cyclohexanol, methylcyclohexanol, benzyl alcohol, phenethyl alcohol, cumyl alcohol, phenol, cresol, 2,6-dimethylphenol, butyl phenol, octyl phenol, nonyl phenol, dibutyl phenol, cumyl phenol and naphthol.

31. The component of claim 21, wherein the active hydrogen containing compound is phenol.

32. The component of claim 21, wherein the organometallic compound used is from about 0.01 to about 10 moles of organometallic compound per mole of active hydrogen containing compound.

33. The component of claim 21, wherein the organometallic compound is selected from the group consisting of:

(1) organo aluminum compounds of the formula:

$$R^1_m Al(OR^2)_n H_p X_q$$

wherein $R^1$ and $R^2$ are identical to, or different from, each other, and represent a hydrocarbon radical containing 1 to 15 carbon atoms, preferably, an alkyl group containing 1 to 8 carbon atoms, or an aryl substituent, X represents a halogen atom, m is more than 0 but not more than 3 ($0 < m \leq 3$), n is at least 0 but less than 3 ($0 \leq n < 3$), p is at least 0 but less than 3 ($0 \leq p < 3$), and q is at least 0 but less than 3 ($0 \leq q < 3$), with the proviso that $m+n+p+q=3$, (2) aluminum complex alkyl compounds of the formula:

$$M^1 AlR_4^3$$

wherein $R^3$ is the same as $R^1$ defined hereinabove or hydrogen, $M^1$ represents lithium, sodium or potassium; and (3) compounds of the formula:

$$R^1 R^4 M^2$$

wherein $R^1$ is the same as defined hereinabove, $R^4$ is the same as $R^1$, or represents a halogen atom, and $M^2$ represents magnesium, zinc or cadmium.

34. The component of claim 21, wherein the organometallic compounds are selected from the group consisting of triethyl aluminum, tributyl aluminum, ethyl aluminum sesquiethoxide, butyl aluminum sesquibutoxide, diethyl aluminum chloride, dibutyl aluminum chloride and diethyl aluminum bromide, ethyl aluminum sesquichloride, butyl aluminum sesquichloride, ethyl aluminum sesquibromide, ethyl aluminum dichloride, propyl aluminum dichloride, and butyl aluminum dibromide, diethyl aluminum hydride, dibutyl aluminum hydride, ethyl aluminum dihydride, propyl aluminum dihydride, ethyl aluminum ethoxychloride, butyl aluminum butoxychloride, ethyl aluminum ethoxybromide, lithium aluminum hydrides, lithium aluminum tetraethyl, sodium aluminum tetrabutyl, potassium aluminum tetraethyl, diethyl magnesium, diethyl zinc, diethyl cadmium and ethyl magnesium chloride.

35. The component of claim 21, wherein the organometallic compound is triethyl aluminum.

36. The component of claim 21, wherein the first and second titanium halide compounds are independently selected from the group consisting of a titanium trichloride material and titanium tetrachloride.

37. The component of claim 21, wherein the quantity of titanium present in the titanium halide containing component is about 0.1% to about 10% by weight, expressed as elemental titanium.

38. The component of claim 21, wherein the electron donor is an organic ester selected from the group consisting of aliphatic carboxylic esters containing up to 18 carbon atoms, halogenated aliphatic carboxylic esters containing up to 18 carbon atoms, alicyclic carboxylic esters containing up to 12 carbon atoms, and aromatic carboxylic esters containing up to 20 carbon atoms.

39. The component of claim 21, wherein the complex is a TiCl$_4$.ethyl benzoate complex.

40. A process for producing a titanium halide containing catalyst component comprising:

(i) copulverizing a halogen containing magnesium compound with an active hydrogen containing organic compound to produce a copulverized product;

(ii) reacting the copulverized product with an organometallic compound of a metal of Groups I to III of the Periodic Table to produce a reaction product;

(iii) copulverizing the reaction product with a complex of a first titanium halide compound and an electron donor to produce a solid reaction product; and (iv) reacting the solid reaction product with a second titanium halide compound.

41. The process of claim 40, wherein the copulverizing step (1) is performed in the presence of an effective amount of an organic or inorganic pulverization aid.

42. The process of claim 41, wherein the pulverization aid is selected from the group consisting of hexane, heptane, kerosene, polystyrene, polypropylene, boron oxide, silicon oxide and organosiloxane.

43. The process of claim 41, wherein the effective amount is from about 0.01 to about 1 times the weight of the halogen containing magnesium compound.

44. The process of claim 40, wherein the halogen containing magnesium compound is MgCl$_2$.

45. The process of claim 40, wherein the active hydrogen containing organic compound is used in an amount of about 0.01 to 10 moles of active hydrogen-containing organic compound per mole of halogen containing magnesium compound.

46. The process of claim 40, wherein the active hydrogen containing organic compound is selected from the group consisting of alcohols, phenols, thiols, primary and secondary amines, aldehydes, organic acids, and amides and imides of organic acids.

47. The process of claim 40, wherein the active hydrogen containing organic compound is an alcohol or a phenol.

48. The process of claim 40, wherein the active hydrogen containing organic compound is selected from the group consisting of aliphatic alcohols containing 1 to 8 carbon atoms, alicyclic alcohols containing 5 to 12 carbon atoms, alcohols with 7 to 18 carbon atoms containing an aromatic ring, and phenols containing 6 to 18 carbon atoms.

49. The process of claim 40, wherein the active hydrogen containing organic compound is selected from the group consisting of methanol, ethanol, n-propanol, n-butanol, i-pentanol, hexanol, 2-ethylhexanol, ethylene glycol monomethylether, cyclohexanol, methylcyclohexanol, benzyl alcohol, phenethyl alcohol, cumyl alcohol, phenol, cresol, 2,6-dimethylphenol, butyl phenol, octyl phenol, nonyl phenol, dibutyl phenol, cumyl phenol and naphthol.

50. The process of claim 40, wherein the active hydrogen containing compound is phenol.

51. The process of claim 40, wherein the organometallic compound used is from about 0.01 to about 10 moles of organometallic compound per mole of active hydrogen containing compound.

52. The process of claim 40, wherein the organometallic compound is selected from the group consisting of:

(1) organoaluminum compounds of the formula:
$R^1_m Al(OR^2)_n H_p X_q$ wherein $R^1$ and $R^2$ are identical to, or different from, each other, and represent a hydrocarbon radical containing 1 to 15 carbon atoms, preferably, an alkyl group containing 1 to 8 carbon atoms, or an aryl substituent, X represents a halogen atom, m is more than 0 but not more than 3 ($0 < m \leq 3$), n is at least 0 but less than 3 ($0 \leq n < 3$), p is at least 0 but less than 3 ($0 \leq p < 3$), and q is at least 0 but less than 3 ($0 \leq q < 3$), with the proviso that $m+n+p+q=3$, (2) aluminum complex alkyl compounds of the formula:

$M^1 AlR_4^3$ wherein $R^3$ is the same as $R^1$ defined hereinabove or hydrogen, $M^1$ represents lithium, sodium or potasium; and (3) compounds of the formula:

$R^1 R^4 M^2$ wherein $R^1$ is the same as defined hereinabove, $R^4$ is the same as $R^1$, or represents a halogen atom, and $M^2$ represents magnesium, zinc or cadmium.

53. The process of claim 40, wherein the organometallic compounds are selected from the group consisting of triethyl aluminum, tributyl aluminum, ethyl aluminum sesquiethoxide, butyl aluminum sesquibutoxide, diethyl aluminum chloride, dibutyl aluminum chloride and diethyl aluminum bromide, ethyl aluminum sesquichloride, butyl aluminum sesquichloride, ethyl aluminum sesquibromide, ethyl aluminum dichloride, propyl aluminum dichloride, and butyl aluminum dibromide, diethyl aluminum hydride, dibutyl aluminum hydride, ethyl aluminum dihydride, propyl aluminum dihydride, ethyl aluminum ethoxychloride, butyl aluminum butoxychloride, ethyl aluminum ethoxybromide, lithium aluminum hydride, lithium aluminum tetraethyl, sodium aluminum tetrabutyl, potassium aluminum tetraethyl, diethyl magnesium, diethyl zinc, diethyl cadmium and ethyl magnesium chloride.

54. The process of claim 40, wherein the organometallic compound is triethyl aluminum.

55. The process of claim 40, wherein the first and second titanium halide compounds are independently selected from the group consisting of a titanium trichloride material and titanium tetrachloride.

56. The process of claim 40, wherein the quantity of titanium present in the titanium halide containing component is about 0.1% to about 10% by weight, expressed as elemental titanium.

57. The process of claim 40, wherein the electron donor is an organic acid ester selected from the group consisting of aliphatic carboxylic esters containing up to 18 carbon atoms, halogenated aliphatic carboxylic esters containing up to 18 carbon atoms, alicyclic carboxylic esters containing up to 12 carbon atoms, and aromatic carboxylic esters containing up to 20 carbon atoms.

58. The process of claim 40, wherein the complex is a $TiCl_4 \cdot$ethyl benzoate complex.

59. The system of claim 1 wherein the halogen-containing magnesium compound is a solid selected from the group consisting of magnesium chloride, magnesium bromide, magnesium iodide, ethoxy magnesium chloride, butoxy magnesium chloride, and magnesium phenoxy halide.

60. The component of claim 21 wherein the halogen-containing magnesium compound is a solid selected from the group consisting of magnesium chloride, magnesium bromide, magnesium iodide, ethoxy magnesium chloride, butoxy magnesium chloride, and magnesium phenoxy halide.

61. The process of claim 40 wherein the halogen-containing magnesium compound is a solid selected from the group consisting of magnesium chloride, magnesium bromide, magnesium iodide, ethoxy magnesium chloride, butoxy magnesium chloride, and magnesium phenoxy halide.

* * * * *

UNITED STATES PATENT AND TRADEMARK OFFICE
CERTIFICATE OF CORRECTION

PATENT NO. : 4,312,782

DATED : January 26, 1982

INVENTOR(S) : Robert Mink et al.

It is certified that error appears in the above—identified patent and that said Letters Patent is hereby corrected as shown below:

Col. 6, line 67, delete "Clhd 2" and insert -- $Cl_2$ --;

Col. 7, line 2, delete "$[N(C_4H_9)]_2$" and insert -- $[N(C_4H_9)_4]_2$ --;

Col. 7, lines 64 and 65, delete "acid";

Col. 9, line 18, delete "of" and insert -- or --;

Col. 10, line 18, delete "n-buylben-" and insert -- n-butylben- --;

Col. 10, line 37, delete "titanium metal" and insert -- elemental titanium --; and Col. 10, line 55, delete "balance" and insert -- absence --.

Signed and Sealed this

Seventh Day of September 1982

[SEAL]

Attest:

GERALD J. MOSSINGHOFF

Attesting Officer     Commissioner of Patents and Trademarks